(12) United States Patent
Kim et al.

(10) Patent No.: US 9,523,705 B2
(45) Date of Patent: Dec. 20, 2016

(54) ACCELERATION SENSOR AND ANGULAR VELOCITY SENSOR

(71) Applicant: SAMSUNG ELECTRO-MECHANICS CO., LTD., Suwon-Si (KR)

(72) Inventors: Jong Woon Kim, Suwon-Si (KR); Jung Won Lee, Suwon-si (KR); Seung Joo Shin, Suwon-si (KR); Won Kyu Jeung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 260 days.

(21) Appl. No.: 14/326,714

(22) Filed: Jul. 9, 2014

(65) Prior Publication Data
US 2015/0033860 A1   Feb. 5, 2015

(30) Foreign Application Priority Data
Jul. 31, 2013   (KR) .................. 10-2013-0091029

(51) Int. Cl.
| | | |
|---|---|---|
| *G01P 15/08* | (2006.01) | |
| *G01C 19/56* | (2012.01) | |
| *G01P 15/135* | (2006.01) | |
| *G01C 19/5719* | (2012.01) | |
| *B60R 21/0132* | (2006.01) | |

(52) U.S. Cl.
CPC ............. *G01P 15/08* (2013.01); *G01C 19/56* (2013.01); *B60R 21/0132* (2013.01); *G01C 19/5719* (2013.01); *G01P 15/0802* (2013.01); *G01P 15/135* (2013.01); *G01P 2015/0805* (2013.01)

(58) Field of Classification Search
CPC ........................................... G01P 15/02
USPC ........................................ 73/514.35, 514.32
IPC ................ G01P 15/02, 15/08, 15/0802, 15/135
See application file for complete search history.

(56) References Cited

U.S. PATENT DOCUMENTS

| | | | | |
|---|---|---|---|---|
| 5,005,413 A | * | 4/1991 | Novack ................. | G01P 15/097 73/514.29 |
| 5,239,870 A | * | 8/1993 | Kaneko ................. | G01P 15/123 338/46 |
| 5,456,110 A | * | 10/1995 | Hulsing, II ........... | G01P 15/097 73/514.35 |
| 5,488,862 A | * | 2/1996 | Neukermans ......| G01C 19/5719 73/504.02 |

(Continued)

FOREIGN PATENT DOCUMENTS

| | | | |
|---|---|---|---|
| JP | 09-505396 | 5/1997 | |
| JP | H09505396 | * 5/1997 | .............. G01P 15/00 |
| WO | 9513545 | 5/1995 | |

OTHER PUBLICATIONS

Office action dated Sep. 30, 2014 from corresponding Korean Patent Application No. 10-2013-0091029 and its English summary provided by the applicant.

*Primary Examiner* — Clayton E Laballe
*Assistant Examiner* — Kevin Butler
(74) *Attorney, Agent, or Firm* — NSIP Law

(57) ABSTRACT

Disclosed herein is an acceleration sensor, including: a mass body part including a first mass body and a second mass body; a frame supporting the first mass body and the second mass body; first flexible parts each connecting the first mass body and the second mass body to the frame; and second flexible parts each connecting the first mass body and the second mass body to the frame, wherein the first mass body and the second mass body are each connected to the frame so as to be eccentric by the second flexible part.

40 Claims, 15 Drawing Sheets

(56) References Cited

U.S. PATENT DOCUMENTS

| | | | | |
|---|---|---|---|---|
| 5,594,170 | A * | 1/1997 | Peters | G01P 1/003 73/514.29 |
| 5,962,786 | A * | 10/1999 | Le Traon | G01P 15/097 310/323.01 |
| 5,962,788 | A * | 10/1999 | Fawcett | G01P 15/0802 73/514.17 |
| 6,009,751 | A * | 1/2000 | Ljung | G01C 19/5719 73/504.02 |
| 6,082,197 | A * | 7/2000 | Mizuno | G01P 15/0802 73/514.32 |
| 6,386,035 | B2 * | 5/2002 | Janiaud | G01P 15/097 73/514.01 |
| 6,487,864 | B1 * | 12/2002 | Platt | F25B 21/02 62/3.2 |
| 6,662,658 | B2 * | 12/2003 | Foote | B81B 3/0051 73/514.29 |
| 8,117,917 | B2 * | 2/2012 | Novack | G01P 15/097 73/514.29 |
| 8,919,198 | B2 * | 12/2014 | Kim | G01C 19/5705 73/504.11 |
| 2003/0150267 | A1 * | 8/2003 | Challoner | G01C 19/5656 73/504.02 |
| 2003/0188577 | A1 * | 10/2003 | Challoner | G01C 19/5719 73/504.02 |
| 2004/0154397 | A1 * | 8/2004 | Platt | G01C 19/5719 73/504.12 |
| 2004/0226377 | A1 * | 11/2004 | Tsugai | G01P 15/125 73/514.32 |
| 2005/0166675 | A1 * | 8/2005 | Hobbs | G01C 19/5719 73/504.12 |
| 2007/0022827 | A1 * | 2/2007 | Ishikawa | G01C 19/5719 73/862.12 |
| 2007/0029629 | A1 * | 2/2007 | Yazdi | B81C 1/00253 257/414 |
| 2007/0180908 | A1 * | 8/2007 | Seeger | G01C 19/5719 73/504.12 |
| 2009/0183569 | A1 * | 7/2009 | Aizawa | G01C 19/5719 73/504.15 |
| 2010/0000321 | A1 * | 1/2010 | Neul | G01C 19/5762 73/504.12 |
| 2010/0071468 | A1 * | 3/2010 | Ohuchi | G01C 19/5719 73/504.12 |
| 2010/0313657 | A1 * | 12/2010 | Trusov | G01C 19/5747 73/504.16 |
| 2011/0146404 | A1 * | 6/2011 | Jeung | G01C 25/005 73/514.34 |
| 2014/0069189 | A1 * | 3/2014 | Kim | G01C 19/5642 73/514.02 |
| 2014/0182375 | A1 * | 7/2014 | Kim | G01C 19/5712 73/504.12 |
| 2014/0290365 | A1 * | 10/2014 | Ju | G01C 19/5719 73/514.39 |
| 2015/0020593 | A1 * | 1/2015 | Kim | G01C 19/5776 73/514.35 |
| 2015/0033860 | A1 * | 2/2015 | Kim | G01C 19/56 73/514.35 |
| 2015/0185010 | A1 * | 7/2015 | Lim | G01P 15/08 73/504.12 |

* cited by examiner

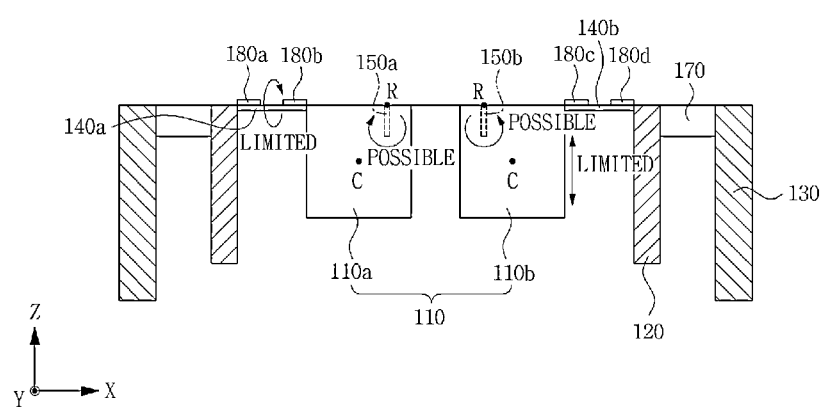
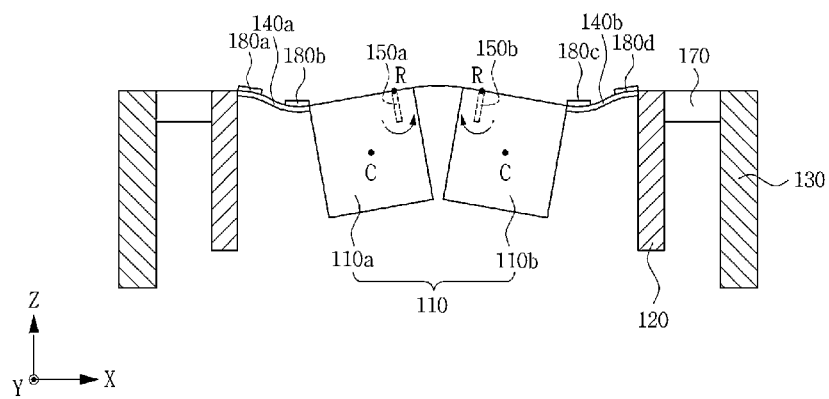

ACCELERATION SENSOR AND ANGULAR VELOCITY SENSOR

CROSS REFERENCE TO RELATED APPLICATION

This application claims the benefit of Korean Patent Application No. 10-2013-0091029, filed on Jul. 31, 2013, entitled "Acceleration Sensor and Angular Velocity Sensor", which is hereby incorporated by reference in its entirety into this application.

BACKGROUND OF THE INVENTION

1. Technical Field

The present invention relates to an acceleration sensor and an angular velocity sensor.

2. Description of the Related Art

Recently, an inertial sensor has been used in various applications, for example, military such as an artificial satellite, a missile, an unmanned aircraft, or the like, vehicles such as an air bag, electronic stability control (ESC), a black box for a vehicle, or the like, hand shaking prevention of a camcorder, motion sensing of a mobile phone or a game machine, navigation, or the like.

In addition, an angular velocity sensor among the inertial sensors generally adopts a configuration in which a mass body is adhered to an elastic substrate such as a membrane, or the like, in order to measure angular velocity. Through the configuration, the angular velocity sensor may calculate the angular velocity by measuring Coriolis force applied to the mass body.

In detail, a scheme of measuring the angular velocity using the angular velocity sensor is as follows. First, the angular velocity may be measured by Coriolis force "$F=2m\Omega v$", where "F" represents the Coriolis force applied to the mass body, "m" represents the mass of the mass body, "$\Omega$" represents the angular velocity to be measured, and "v" represents the motion velocity of the mass body. Among others, since the motion velocity v of the mass body and the mass m of the mass body are values known in advance, the angular velocity $\Omega$ may be obtained by detecting the Coriolis force (F) applied to the mass body.

Meanwhile, the angular velocity sensor according to the prior art includes a piezoelectric material disposed on a membrane (a diaphragm) in order to drive a mass body or sense displacement of the mass body, as disclosed in Patent Document of the following Prior Art Document. In order to measure the angular velocity using the angular velocity sensor, it is preferable to allow a resonant frequency of a driving mode and a resonant frequency of a sensing mode to almost coincide with each other. However, very large interference occurs between the driving mode and the sensing mode due to a fine manufacturing error caused by a shape, stress, a physical property, or the like. Therefore, since a noise signal significantly larger than an angular velocity signal is output, circuit amplification of the angular velocity signal is limited, such that sensitivity of the angular velocity sensor is deteriorated.

PRIOR ART DOCUMENT

Patent Document (Patent Document 1) US20110146404 A1

SUMMARY OF THE INVENTION

The present invention has been made in an effort to provide an acceleration sensor capable of simultaneously detecting physical amounts for multiple axes by including two mass bodies connected to be spaced apart from the center of gravity to thereby generate different displacements.

The present invention has been made in an effort to provide an angular velocity sensor capable of removing interference between a driving mode and a sensing mode and decreasing an effect due to a manufacturing error by driving a frame and a mass body by one driving part to individually generate driving displacement and sensing displacement of the mass body and having a flexible part formed so that the mass body is movable only in a specific direction.

The present invention has been made in an effort to provide an angular velocity sensor capable of accurately detecting an angular velocity of two axes by including two mass bodies connected to be spaced apart from the center of gravity and using different driving and displacements of a first mass body and a second mass body caused by the frame driving.

According to a preferred embodiment of the present invention, there is provided an acceleration sensor, including: a mass body part including a first mass body and a second mass body; a frame supporting the first mass body and the second mass body; first flexible parts each connecting the first mass body and the second mass body to the frame; and second flexible parts each connecting the first mass body and the second mass body to the frame, wherein the first mass body and the second mass body are each connected to the frame so as to be eccentric by the second flexible part.

The first flexible parts and the second flexible parts may be disposed in a direction perpendicular to each other.

The first mass body and the second mass body may have one end having the first flexible parts each connected thereto and may have the other end portions having the second flexible parts each connected thereto.

The first mass body and the second mass body may have one end having the first flexible parts each connected thereto with respect to an X axis direction and may have the other end portions having the second flexible parts connected thereto in a Y axis direction with respect to the X axis direction.

The first mass body and the second mass body may face each other so that coupling parts having the second flexible parts each coupled thereto are adjacent to each other rather than coupling parts having the first flexible parts each coupled thereto.

The first flexible parts may be beams having a surface formed by one axis direction and the other axis direction and a thickness extended in a direction perpendicular to the surface.

The first flexible parts may have a predetermined thickness in a Z axis direction, may be beams configured of a surface formed by an X axis and a Y axis, and may be formed so as to have a width $W_1$ in a Y axis direction larger than a thickness $T_1$ in the Z axis direction.

The first flexible parts may connect one end portion of the first mass body and the frame to each other and may connect one end portion of the second mass body and the frame to each other, in the X axis direction.

One surface of the first flexible parts or the second flexible parts may be selectively provided with a sensing unit sensing displacement of the first mass body and the second mass body.

The second flexible parts may be hinges having a thickness in one axis direction and having a surface formed in the other axis direction.

The second flexible parts may be hinges having a predetermined thickness in an X axis direction and having a surface formed by a Y axis and a Z axis.

The second flexible parts may be formed so as to have a width $W_2$ in a Z axis direction larger than a thickness $T_2$ in the X axis direction.

The second flexible parts may connect the first mass body and the frame to each other and may connect the second mass body and the frame to each other, in a Y axis direction.

The second flexible parts may have a hinge shape having a rectangular cross section or a torsion bar shape having a circular cross section.

According to a preferred embodiment of the present invention, there is provided an angular velocity sensor, including: a mass body part including a first mass body and a second mass body; an internal frame supporting the first mass body and the second mass body; first flexible parts each connecting the first mass body and the second mass body to the internal frame; second flexible parts each connecting the first mass body and the second mass body to the internal frame, an external frame supporting the internal frame; a third flexible part connecting the internal frame and the external frame to each other; and a fourth flexible part connecting the internal frame and the external frame to each other, wherein the first mass body and the second mass body are each connected to the internal frame so as to be eccentric by the second flexible part.

The first flexible parts and the second flexible parts may be disposed in a direction perpendicular to each other.

The third flexible part and the fourth flexible part may be disposed in a direction perpendicular to each other.

The third flexible part may be disposed in a direction perpendicular to the first flexible parts.

The fourth flexible part may be disposed in a direction perpendicular to the second flexible parts.

The first flexible parts may be beams having a surface formed by one axis direction and the other axis direction and a thickness extended in a direction perpendicular to the surface.

The first flexible parts may have a predetermined thickness in a Z axis direction, may be beams configured of a surface formed by an X axis and a Y axis, and may be formed so as to have a width $W_1$ in a Y axis direction larger than a thickness $T_1$ in a Z axis direction.

The first flexible parts may connect one end portion of the first mass body and the internal frame to each other and may connect one end portion of the second mass body and the internal frame to each other, in the X axis direction.

One surface of the first flexible parts or the second flexible parts may be selectively provided with a sensing unit sensing displacement of the first mass body and the second mass body.

The second flexible parts may be hinges having a thickness in one axis direction and having a surface formed in the other axis direction.

The second flexible parts may be hinges having a predetermined thickness in an X axis direction and having a surface formed by a Y axis and a Z axis.

The second flexible parts may be formed so as to have a width $W_2$ in a Z axis direction larger than a thickness $T_2$ in the X axis direction.

The second flexible parts may connect the first mass body and the internal frame to each other and may connect the second mass body and the internal frame to each other, in a Y axis direction.

The second flexible parts may have a hinge shape having a rectangular cross section or a torsion bar shape having a circular cross section.

The third flexible part may be a beam having a surface formed by one axis direction and the other axis direction and a thickness extended in a direction perpendicular to the surface.

The third flexible part may have a predetermined thickness in a Z axis direction, may be a beam configured of a surface formed by an X axis and a Y axis, and may be formed so as to have a width $W_3$ in an X axis direction larger than a thickness $T_3$ in the Z axis direction.

The fourth flexible part may be a hinge having a thickness in one axis direction and having a surface formed in the other axis direction.

The fourth flexible part may be a hinge having a predetermined thickness in a Y axis direction and having a surface formed by an X axis and a Z axis.

The fourth flexible part may be formed so as to have a width $W_4$ in a Z axis direction larger than a thickness $T_4$ in a Y axis direction.

The fourth flexible part may be disposed so as to correspond to the centers of gravity of the first mass body and the second mass body.

One surface of the third flexible part or the fourth flexible part may be selectively provided with a driving unit driving the internal frame.

When the internal frame is be driven by the driving unit, the internal frame may be rotated based on an axis having the fourth flexible part coupled thereto, with respect to the external frame.

When the internal frame is rotated based the axis having the fourth flexible part coupled thereto, the third flexible part may generate bending stress and the fourth flexible part generates torsion stress.

When the internal frame is rotated based the axis having the fourth flexible part coupled thereto, the first mass body and the second mass body may be rotated based on an axis having the second flexible parts coupled thereto, with respect to the internal frame.

When the first mass body and the second mass body are rotated, the first flexible parts may generate bending stress and the second flexible parts generate torsion stress.

The first mass body and the second mass body may have one end having the first flexible parts each connected thereto and may have the other end portions having the second flexible parts each connected thereto.

The first mass body and the second mass body may have one end having the first flexible parts each connected thereto with respect to an X axis direction and may have the other end portions having the second flexible parts connected thereto in a Y axis direction with respect to the X axis direction.

The first mass body and the second mass body may face each other so that coupling parts having the second flexible parts each coupled thereto are adjacent to each other rather than coupling parts having the first flexible parts each coupled thereto.

BRIEF DESCRIPTION OF THE DRAWINGS

The above and other objects, features and advantages of the present invention will be more clearly understood from the following detailed description taken in conjunction with the accompanying drawings, in which:

FIG. 13 is a cross-sectional view showing the movable directions of the first mass body and the second mass body in the angular velocity sensor shown in FIG. 10;

FIGS. 14A and 14B are cross-sectional views showing a process in which the first mass body and the second mass body shown in FIG. 10 are rotated based on second flexible parts with respect to an internal frame;

DESCRIPTION OF THE PREFERRED EMBODIMENTS

Figure 1:
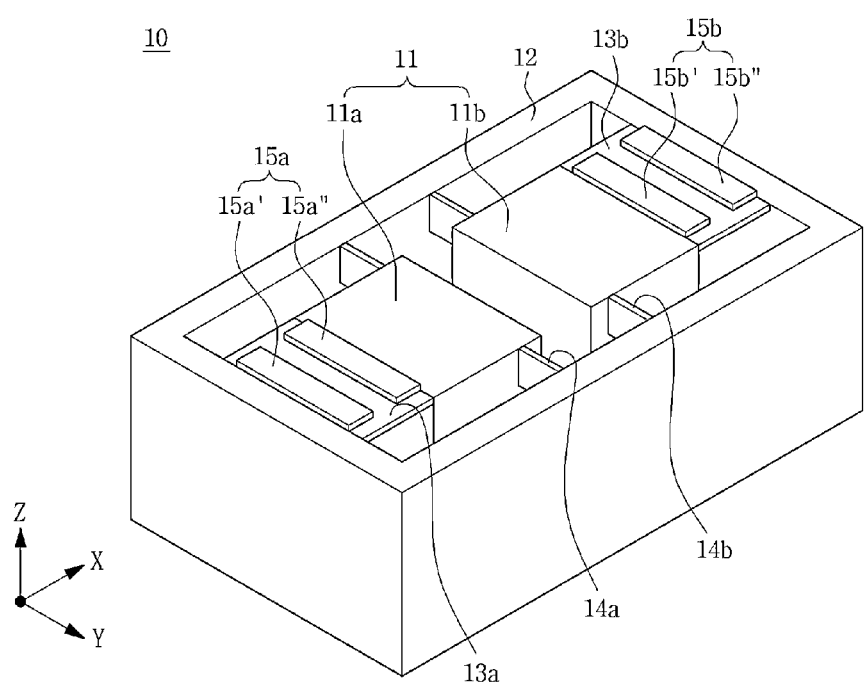
FIG. 1 is a perspective view schematically showing an acceleration sensor according to a preferred embodiment of the present invention.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the accompanying drawings.

Figure 2:
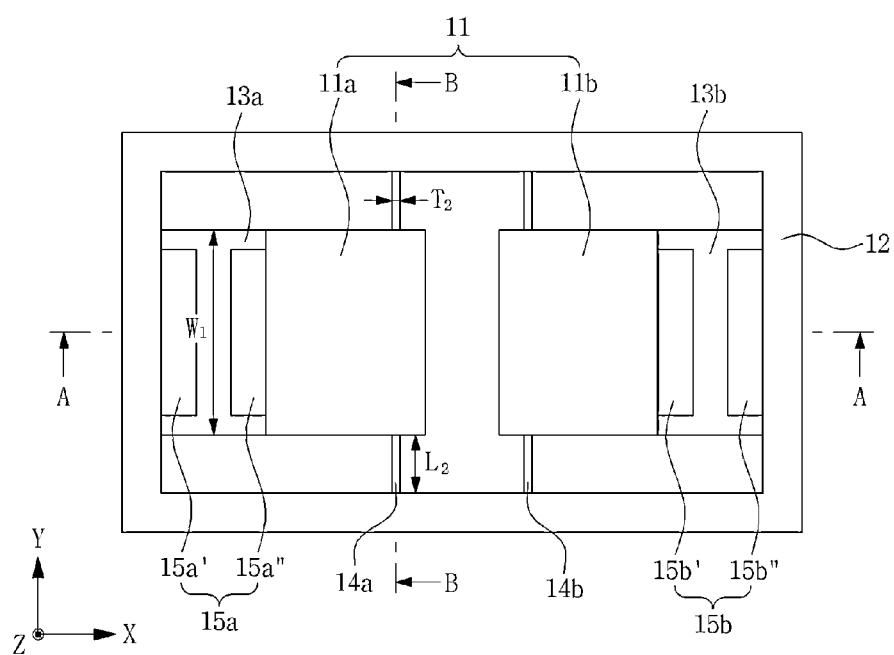
FIG. 2 is a plan view of the acceleration sensor shown in FIG. 1.
Figure 3:
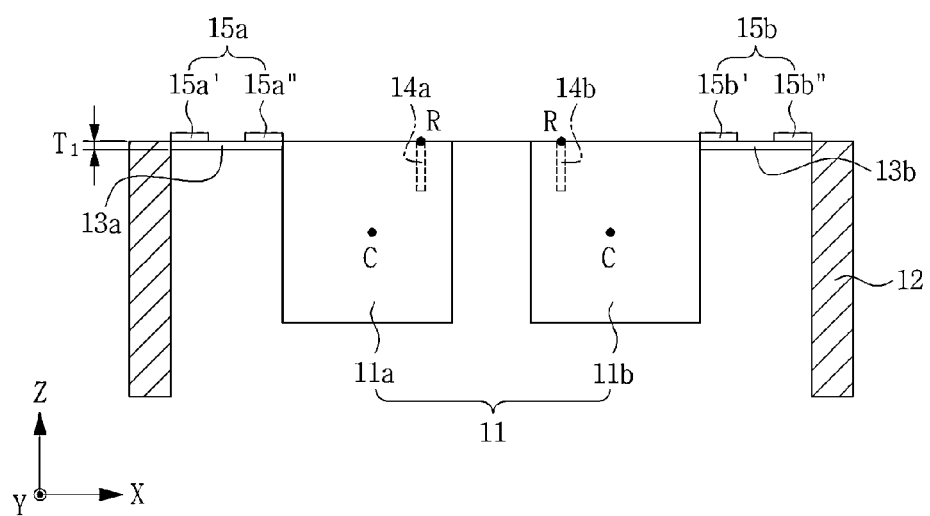
FIG. 3 is a schematic cross-sectional view taken along a line A-A of the acceleration sensor shown in FIG. 1.
Figure 4:
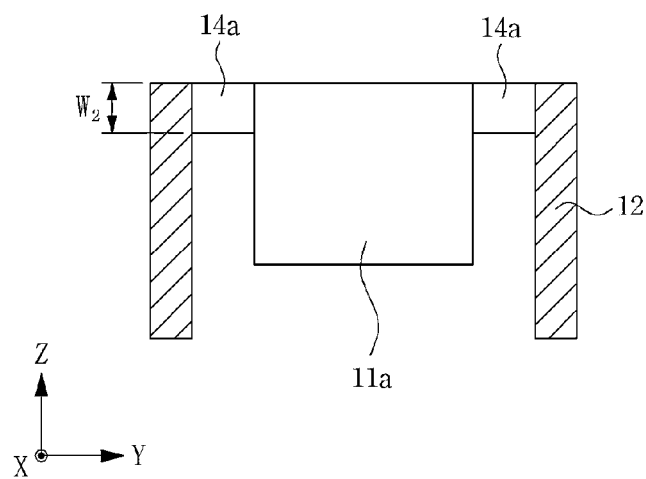
FIG. 4 is a schematic cross-sectional view taken along a line B-B of the acceleration sensor shown in FIG. 1.

FIG. 1 is a perspective view schematically showing an acceleration sensor according to a preferred embodiment of the present invention, FIG. 2 is a plan view of the acceleration sensor shown in FIG. 1, FIG. 3 is a schematic cross-sectional view taken along a line A-A of the acceleration sensor shown in FIG. 1, and FIG. 4 is a schematic cross-sectional view taken along a line B-B of the acceleration sensor shown in FIG. 1.

As shown, the acceleration sensor 10 is configured to include a mass body part 11 including a first mass body 11a and a second mass body 11b, a frame 12, first flexible parts 13a and 13b, and second flexible parts 14a and 14b, where the first mass body 11a and the second mass body 11b are connected to the second flexible parts 14a and 14b, respectively so as to be spaced apart from a center of gravity.

That is, the first mass body 11a and the second mass body 11b are each connected to the frame by the second flexible parts 14a and 14b so as to be eccentric.

In addition, the first flexible parts 13a and 13b and the second flexible parts 14a and 14b are selectively provided with sensing units 15a and 15b. FIG. 1 shows that the first flexible parts 13a and 13b are provided with the sensing units 15a and 15b, as a preferred embodiment of the present invention. In addition, the sensing unit may be formed in a piezoelectric scheme, a piezoresistive scheme, a capacitive scheme, an optical scheme, or the like, but is not particularly limited thereto.

More specifically, the first mass body 11a and the second mass body 11b, which generate displacement by inertial force, Coriolis' force, external force, or the like, are formed in the same size and shape and displaced so as to face each other.

In addition, the first mass body 11a and the second mass body 11b are connected to the frame 12 by the first flexible parts 13a and 13b and the second flexible parts 14a and 14b, and are supported in a floating state so as to be displaceable by the frame 12.

In addition, although the case in which the first mass body 11a and the second mass body 11b have a generally square pillar shape is shown, the first mass body 11a and the second mass body 11b are not limited to having the above-mentioned shape, but may have all shapes known in the art.

In addition, each of the first flexible part 13a and the second flexible part 14a is connected to the first mass body 11a, such that the first flexible part 13a is connected to one end of the first mass body 11a and the second flexible part 14a is connected to the other end portion of the first mass body 11a. That is, the first mass body 11a has the first flexible part 13a connected to only one end with respect to an X axis direction and the second flexible part 14a connected to the other end portion in a Y axis direction with respect to the X axis direction.

Correspondingly, the first flexible part 13b is connected to one end of the second mass body 11b and the second flexible part 14b is connected to the other end portion of the second mass body 11b. That is, the second mass body 11b has the first flexible part 13a connected to only one end with respect to the X axis direction and the second flexible part 14b connected to the other end portion in the Y axis direction with respect to the X axis direction.

Further, the first mass body 11a and the second mass body 11b are disposed so that coupling parts having the second flexible parts 14a and 14b each coupled thereto are adjacent to each other rather than coupling parts having the first flexible parts 13a and 13b each connected thereto.

Through the above-mentioned configuration, when force is applied to the first mass body 11a and the second mass body 11b, the first flexible parts 13a and 13b generate displacement and the second flexible parts 14a and 14b cause warpage, such that the first mass body 11a and the second mass body 11b are rotated based on the second flexible parts 14a and 14b coupled to the frame 12. To this end, shapes of the first flexible parts 13a and 13b and the second flexible parts 14a and 14b, and more specific organic coupling relationships between the first mass body 11a and the second mass body 11b and the first flexible parts 13a and 13b and the second flexible parts 14a and 14b will be described below.

Next, the frame 12, which is to support the first mass body 11a and the second mass body 11b in a floating state so as to be displaceable, secures a space in which the first mass body 11a and the second mass body 11b connected to each other by the first flexible parts 13a and 13b and the second flexible parts 14a and 14b may generate the displacement.

To this end, the first mass body 11a and the second mass body 11b may be embedded in an inner portion of the frame 12 as shown in FIG. 1. To this end, the frame 12 may have a square pillar shape in which it has a square pillar shaped cavity formed at the center thereof, but is not limited thereto. That is, the frame 12 may be formed in various shapes and structures capable of supporting the first mass body 11a and the second mass body 11b.

In addition, the first mass body 11a and the second mass body 11b have one end portion each connected to the internal frame 12 in the X axis direction by the first flexible parts 13a and 13b. In this case, the first mass body 11a and the second mass body 11b have the other ends, which are not adjacent to each other with respect to the X axis direction, having the first flexible parts 13a and 13b connected thereto and one end portion adjacent to each other having the second flexible parts 14a and 14b each connected thereto in the Y axis direction.

In addition, as shown in FIG. 3, the second flexible parts 14a and 14b are connected to the first mass body 11a and the second mass body 11b so as to be spaced apart from the centers C of gravity of the first mass body 11a and the second mass body 11b by a predetermined interval, respectively. That is, the first mass body 11a and the second mass body 11b are each connected to the frame 12 by the second flexible parts 14a and 14b so as to be eccentric.

Next, the first flexible parts 13a and 13b are beams having a predetermined thickness in a Z axis direction and made of a surface formed by the X axis and Y axis. That is, the first flexible part is formed so as to have a width $W_1$ in the Y axis direction larger than a thickness $T_1$ in the Z axis direction.

In addition, the first flexible parts 13a and 13b may have sensing units 15a and 15b formed thereon. When viewing based on an X-Y plane, since the first flexible parts 13a and 13b are relatively wide as compared to the second flexible parts 14a and 14b, the first flexible parts 13a and 13b may be provided with the sensing units 15a and 15b sensing the displacement of the first mass body 11a and the second mass body 11b.

In addition, in order to more accurately detect the displacement of the first mass body 11a and the second mass body 11b, respectively, the sensing units 15a and 15b are formed of a first sensing unit 15a', a second sensing unit 15", a third sensing unit 15b', and a fourth sensing unit 15b".

In addition, the first sensing unit 15a' and the second sensing unit 15a" are formed on the first flexible part 13a connected to the first mass body 11a, and the third sensing unit 15b' and the fourth sensing unit 15b" are formed on the first flexible part 13b connected to the second mass body 11b.

In addition, the second flexible parts 14a and 14b are hinges having a predetermined thickness in the X axis direction and having a surface formed by Y axis and the Z axis. That is, the second flexible parts 14a and 14b are formed so as to have a width $W_2$ in the Z axis direction larger than a thickness $T_2$ in the X axis direction.

In addition, the first flexible parts 13a and 13b and the second flexible parts 14a and 14b are disposed in a direction perpendicular to each other. That is, the first flexible parts 13a and 13b connect the first and second mass bodies 11a and 11b and the frame 12 to each other in the X axis direction, respectively, and the second flexible parts 14a and 14b connect the first and second mass bodies 11a and 11b and the frame 12 to each other in the Y axis direction, respectively.

Through the above-mentioned configuration, since the second flexible parts 14a and 14b have a width $W_2$ in the Z axis direction larger than a thickness $T_2$ in the X axis direction, the first mass body 11a and the second mass body 11b are limited from being rotated based on the Z axis or translated in the X axis direction, but may be relatively freely rotated based on the Y axis. That is, the first mass body 11a and the second mass body 11b are rotated based on the Y axis direction in a state supported by the frame 12 and the second flexible parts 14a and 14b serve as a hinge for the above-mentioned rotation.

Hereinafter, moveable directions of the mass bodies in the acceleration sensor according to the preferred embodiment of the present invention will be described in detail with reference to the drawings.

Figure 5:
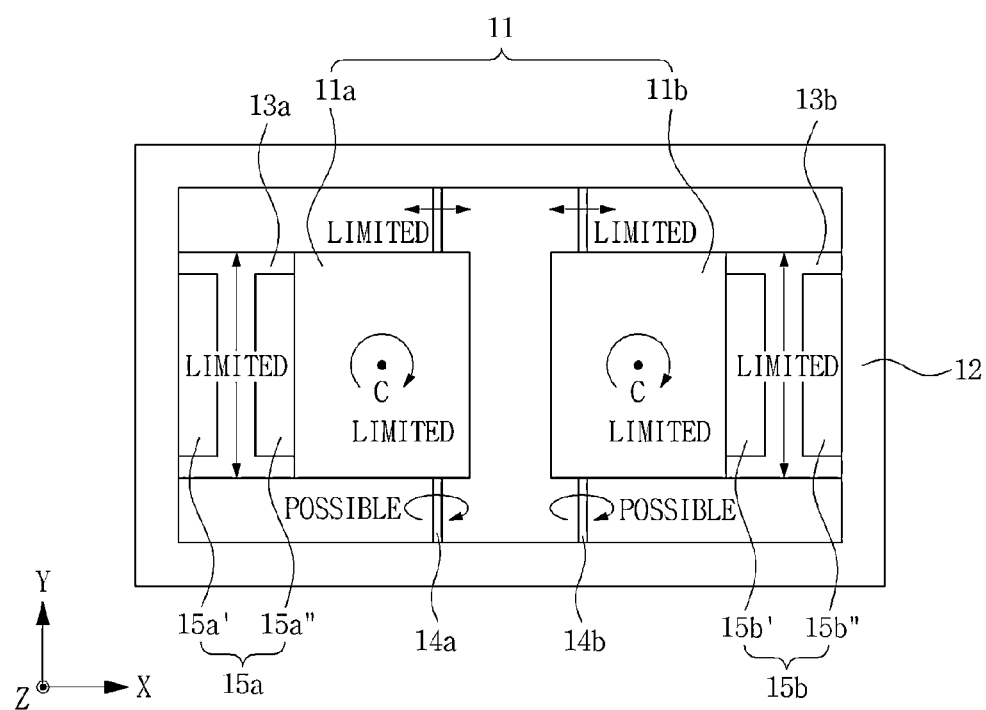
FIG. 5 is a plan view showing movable directions of a first mass body and a second mass body in the acceleration sensor shown in FIG. 1.
Figure 6:
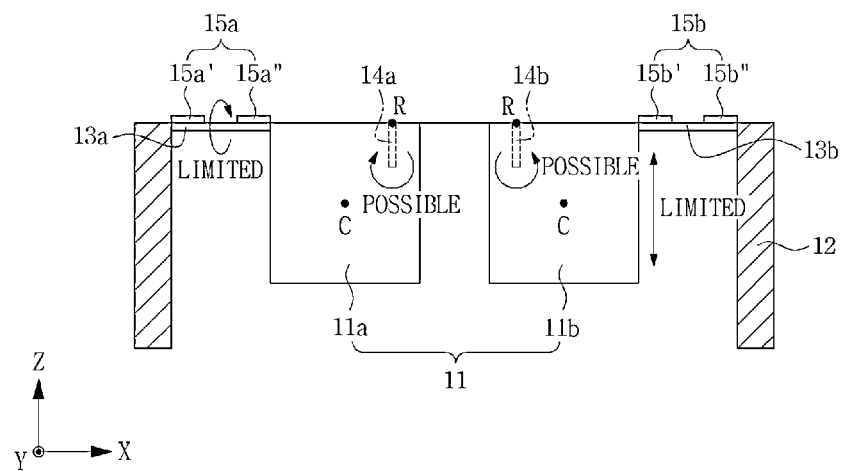
FIG. 6 is a cross-sectional view showing the movable directions of the first mass body and the second mass body in the acceleration sensor shown in FIG. 3.

FIG. 5 is a plan view showing movable directions of a first mass body and a second mass body in the acceleration sensor shown in FIG. 1 and FIG. 6 is a cross-sectional view showing the movable directions of the first mass body and the second mass body in the acceleration sensor shown in FIG. 3.

First, since the second flexible parts 14a and 14b have the width $W_2$ in the Z axis direction larger than the thickness $T_2$ in the X axis direction, the first mass body 11a the second mass body 11b are limited from being rotated based on the X axis or translated in the Z axis direction, but may be relatively freely rotated based on the Y axis with respect to the frame 12.

Specifically, in the case in which rigidity of the second flexible parts 14a and 14b at the time of rotation based on the X axis is larger than rigidity of the second flexible parts 14a and 14b at the time of rotation based on the Y axis, the first mass body 11a and second mass body 11b may be freely rotated based on the Y axis, but are limited from being rotated based on the X axis. Similarly, in the case in which rigidity of the second flexible parts 14a and 14b at the time of translation in the Z axis direction is larger than the rigidity of the second flexible parts 14a and 14b at the time of the rotation based on the Y axis, the second flexible parts 14a and 14b may be freely rotated based on the Y axis, but are limited from being translated in the Z axis direction.

Therefore, as a value of (the rigidity of the second flexible parts 14a and 14b at the time of the rotation based on the X axis or the rigidity of the second flexible parts 14a and 14b at the time of the translation in the Z axis direction)/(the rigidity of the second flexible parts 14a and 14b at the time of the rotation based on the Y axis) increases, the first mass body 11a and the second mass body 11b may be freely rotated based on the Y axis, but are limited from being rotated based on the X axis or translated in the Z axis direction, with respect to the frame 12.

That is, as shown in FIGS. 2 and 4, relationships among the width $W_2$ of the second flexible parts 14a and 14b in the Z axis direction, a length $L_2$ thereof in the Y axis, the thickness $T_2$ thereof in the X axis, and the rigidities thereof in each direction may be represented by the following Equations.

(1) The rigidity of the second flexible parts 14a and 14b at the time of the rotation based on the X axis or the rigidity thereof at the time of the translation in the Z axis direction is $\propto T_2 \times W_2^3 / L_2^3$, (2) The rigidity of the second flexible parts 14a and 14b at the time of the rotation based on the Y axis is $\propto T_2^3 \times W_2 / L_2$. According to the above two Equations, the value of (the rigidity of the second flexible parts 14a and 14b at the time of the rotation based on the X axis or the rigidity of the second flexible parts 14a and 14b at the time of the translation in the Z axis direction)/(the rigidity of the second flexible parts 14a and 14b at the time of the rotation based on the Y axis) is in proportion to $(W_2/(T_2 L_2))^2$.

However, since the second flexible parts 14a and 14b have the width W2 in the Z axis direction larger than the thickness $T_2$ in the X axis direction, $(W_2/(T_2 L_2))^2$ is large, such that the value of (the rigidity of the second flexible parts 14a and 14b at the time of the rotation based on the X axis or the rigidity of the second flexible parts 14a and 14b at the time of the translation in the Z axis direction)/(the rigidity of the second flexible parts 14a and 14b at the time of the rotation based on the Y axis) increases. Due to these characteristics of the second flexible parts 14a and 14b, the first mass body 11a and second mass body 11b are freely rotated based on the Y axis, but are limited from being rotated based on the X axis or translated in the Z axis direction, with respect to the frame 12.

Meanwhile, the first flexible parts 13a and 13b have relatively very high rigidity in the length direction (X axis direction), thereby making it possible to limit the first and second mass bodies 11a and 11b from being rotated based on the Z axis or translated in the Z axis direction, with respect to the frame 12. In addition, the second flexible parts 14a and 14b have relatively very high rigidity in the length direction (Y axis direction), thereby making it possible to limit the first and second mass bodies 11a and 11b from being translated in the Y axis direction, with respect to the frame 12.

As a result, due to the characteristics of the first flexible parts 13a and 13b and the second flexible parts 14a and 14b described above, the first and second mass bodies 11a and 11b may be rotated based on the Y axis, but are limited from being rotated based on the X or Z axis or translated in the Z, Y, or X axis direction, with respect to the frame 12. That is, the movable directions of the first and second mass bodies 11a and 11b may be represented by the following Table 1.

TABLE 1

| Movement directions of the first mass body and the second mass body (based on the frame) | Whether or not movement is possible |
| --- | --- |
| Rotation based on X axis | Limited |
| Rotation based on Y axis | Possible |
| Rotation based on Z axis | Limited |
| Translation in X axis direction | Limited |

TABLE 1-continued

| Movement directions of the first mass body and the second mass body (based on the frame) | Whether or not movement is possible |
| --- | --- |
| Translation in Y axis direction | Limited |
| Translation in Z axis direction | Limited |

As described above, since the first mass body 11a and second mass body 11b may be rotated based on the Y axis, that is, the second flexible parts 14a and 14b, but are limited from being moved in the remaining directions, with respect to the frame 12, the first mass body 11a and the second mass body 11b may be allowed to be displaced only with respect to force in a desired direction (the rotation based on the Y axis).

Figure 7A:
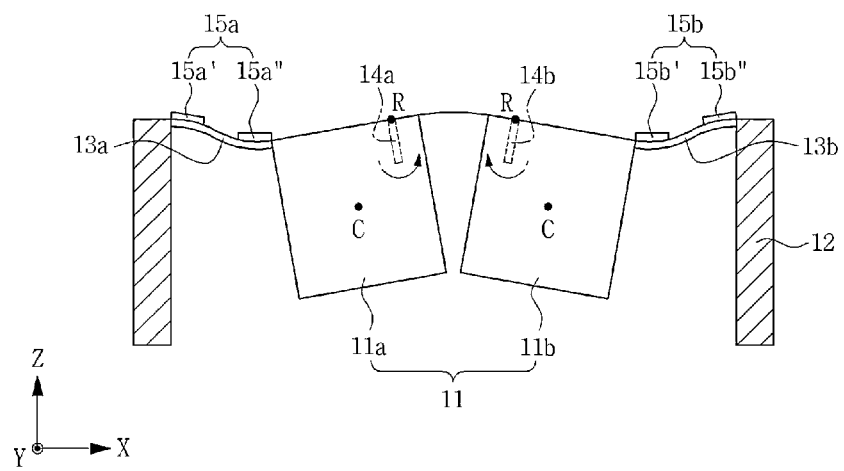
FIGS. 7A and 7B are cross-sectional views showing a process in which the first mass body and the second mass body are rotated based on second flexible parts in the acceleration sensor shown in FIG. 3.
Figure 7B:
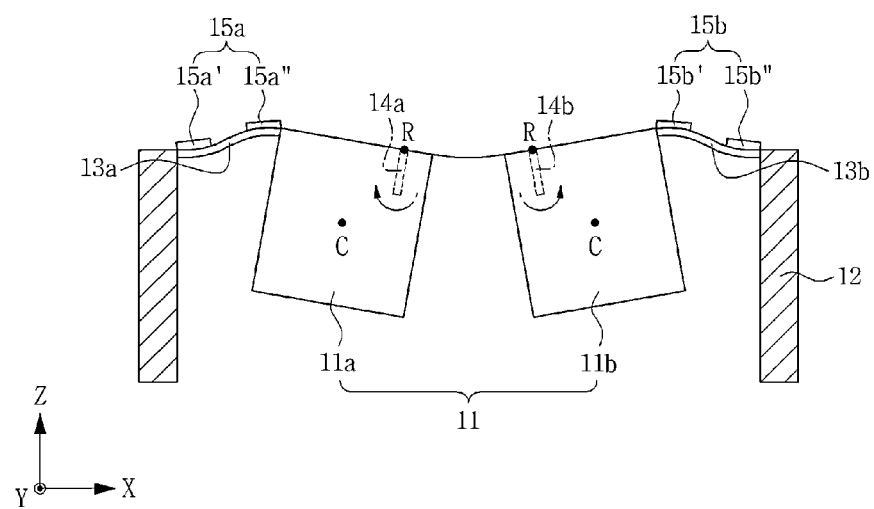

FIGS. 7A and 7B are cross-sectional views showing a process in which the first mass body and the second mass body are rotated based on a second flexible part in the acceleration sensor shown in FIG. 3.

As shown, the first mass body 11a and the second mass body 11b are rotated based on the Y axis with respect to a rotation axis R. In this case, the first flexible parts 13a and 13b generate compressive stress and bending stress, and the second flexible parts 14a and 14b generate torsion stress based on the Y axis. In this case, in order to generate a torque in the first mass body 11a and the second mass body 11b, the second flexible parts 14a and 14b may be connected the first mass body 11a and the second mass body 11b over the centers C of gravity of the first mass body 11a and the second mass body 11b based on the Z axis direction.

In addition, in order to simultaneously detect acceleration of two axes, that is, the X axis and the Z axis, the second flexible parts 14a and 14b are coupled to the first mass body 11a and the second mass body 11b so as to be spaced apart from the centers C of gravity of the first mass body 11a and the second mass body 1 by a predetermined interval.

In addition, by summation and difference of the displacements of the first mass body 11a and the second mass body 11b, components of the X axis acceleration and the Z axis acceleration are separated to detect the X axis acceleration and the Z axis acceleration.

More specifically, when defining a detection value of the first sensing unit 15a' as S1, a detection value of the second sensing unit 15a'' as S2, a detection value of the third sensing unit 15b' as S3, and a detection value of the fourth sensing unit 15b'' as S4, The X axis direction acceleration AX is operated as (S1+S3)−(S2+S4), and The Z axis direction acceleration AZ is operated as (S1+S4)−(S2−S3).

As described above, the acceleration sensor according to the preferred embodiment of the present invention may prevent crosstalk from being generated by controlling the displacement direction by the second flexible parts, and may remove interference of a resonant mode to thereby detect the acceleration in the two axes directions.

Figure 8:
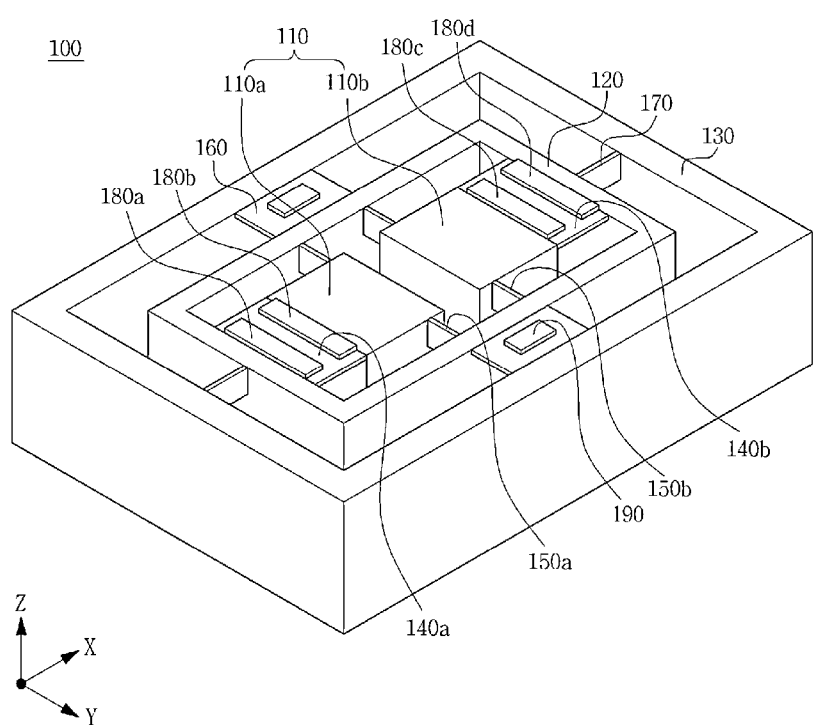
FIG. 8 is a perspective view schematically showing an angular velocity sensor according to a preferred embodiment of the present invention.
Figure 9:
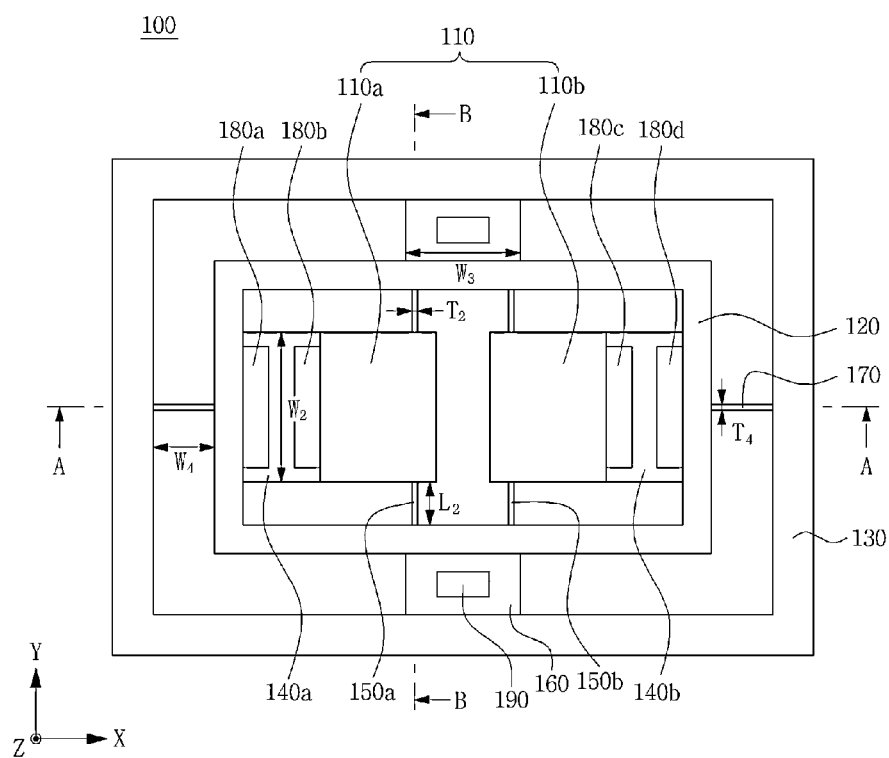
FIG. 9 is a plan view of the angular velocity sensor shown in FIG. 8.
Figure 10:
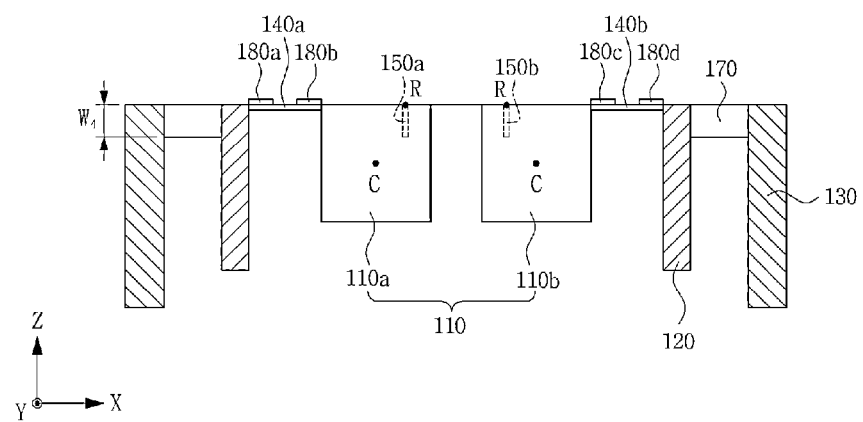
FIG. 10 is a schematic cross-sectional view taken along a line A-A of the angular velocity sensor shown in FIG. 9.
Figure 11:
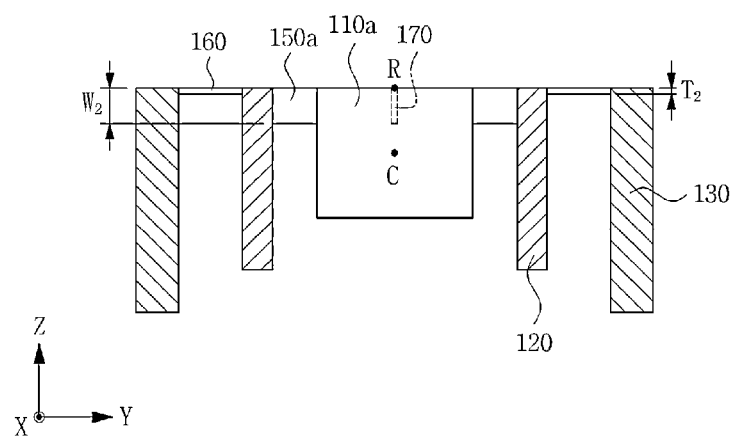
FIG. 11 is a schematic cross-sectional view taken along a line B-B of the angular velocity sensor shown in FIG. 9.

FIG. 8 is a perspective view schematically showing an angular velocity sensor according to a preferred embodiment of the present invention, FIG. 9 is a plan view of the angular velocity sensor shown in FIG. 8, FIG. 10 is a schematic cross-sectional view taken along a line A-A of the angular velocity sensor shown in FIG. 9, and FIG. 11 is a schematic cross-sectional view taken along a line B-B of the angular velocity sensor shown in FIG. 9.

As shown, the angular velocity sensor 100 includes the acceleration sensor shown in FIG. 1 as a detection module. In addition to this, the angular velocity sensor 100 is configured to include an external frame supporting the detection module, flexible parts connecting the detection module to the external frame, and a driving unit driving the detection module.

More specifically, the angular velocity sensor 100 is configured to include a mass body part 110, an internal frame 120, an external frame 130, first flexible part 140a and 140b, second flexible parts 150a and 150b, a third flexible part 160, and a fourth flexible part 170.

In addition, the first flexible parts 140a and 140b and the second flexible parts 150a and 150b are selectively provided with sensing units 180a, 180b, 180c, and 180d and the third flexible part 160 and the fourth flexible part 170 are selectively provided with a driving unit 190.

FIG. 8 shows that that the first flexible parts 140a and 140b are provided with the sensing units 180a, 180b, 180c, and 180d, and the third flexible part 160 is provided with the driving unit 190, as a preferred embodiment of the present invention.

In addition, the mass body part 110, which generates displacement by inertial force, Coriolis' force, external force, or the like, is formed of a first mass body 110a and a second mass body 110b, where the first mass body 110a and the second mass body 110b are formed in the same size and shape and disposed so as to face each other.

In addition, the first mass body 110a and the second mass body 110b are connected to the frame 120 by the first flexible parts 140a and 140b and the second flexible parts 150a and 150b, and are supported in a floating state so as to be displaceable by the frame 120.

In addition, although the case in which the first mass body 110a and the second mass body 110b have a generally square pillar shape is shown, the first mass body 110a and the second mass body 110b are not limited to having the above-mentioned shape, but may have all shapes known in the art.

In addition, the first mass body 110a and the second mass body 110b are connected to the first flexible parts 140a and 140b and the second flexible parts 150a and 150b, respectively, as described above. In this case, the second flexible parts 150a and 150b are connected to the first mass body 110a and the second mass body 110b, respectively, so as to be spaced apart from the centers of gravity of the first mass body 110a and the second mass body 110b.

That is, the first mass body 110a and the second mass body 110b are each connected to the frame by the second flexible parts 150a and 150b so as to be eccentric.

More specifically, the first mass body 110a is connected to the first flexible part 140a and the second flexible part 150a, respectively. In addition, the first mass body 110a has first flexible part 140a connected to one end thereof and has the second flexible part 150a connected to the other end portion thereof. That is, the first mass body 110a has the first flexible part 140a connected to only one end with respect to an X axis direction and the second flexible part 150a connected to the other end portion in a Y axis direction with respect to the X axis direction.

Correspondingly, the first flexible part 140b is connected to one end of the second mass body 110b and the second flexible part 150b is connected to the other end portion of the first mass body 110b. That is, the second mass body 11b has the first flexible part 140a connected to only one end with respect to the X axis direction and the second flexible part 150b connected to the other end portion in the Y axis direction with respect to the X axis direction.

Through the above-mentioned configuration, when force is applied to the first mass body 110a and the second mass body 110b, the first flexible parts 140a and 140b generate displacement and the second flexible parts 150a and 150b cause warpage, such that the first mass body 110a and the second mass body 110b are rotated based on the second flexible parts 150a and 150b coupled to the frame 120.

To this end, shapes of the first flexible parts 140a and 140b and the second flexible parts 150a and 150b, and more specific organic coupling relationships between the first mass body 110a and the second mass body 110b and the first flexible parts 140a and 140b and the second flexible parts 150a and 150b will be described below.

Next, the internal frame 120 supports the first mass body 110a and the second mass body 110b in a floating state so as to be displaceable. In addition, the internal frame 120 secures a space in which the first mass body 110a and the second mass body 110b connected to each other by the first flexible parts 140a and 140b and the second flexible parts 150a and 150b may generate the displacement.

To this end, the first mass body 110a and the second mass body 110b may be embedded in an inner portion of the frame 120 as shown in FIGS. 8 and 9. To this end, the frame 120 may have a square pillar shape in which it has a square pillar shaped cavity formed at the center thereof, but is not limited thereto. That is, the frame 120 may be formed in various shapes and structures capable of supporting the first mass body 110a and the second mass body 110b.

In addition, the first mass body 110a and the second mass body 110b have one end portion each connected to the internal frame 12 in the X axis direction by the first flexible parts 140a and 140b. In this case, the first mass body 110a and the second mass body 110b have the other ends, which are not adjacent to each other with respect to the X axis direction, having the first flexible parts 140a and 140b connected thereto and one end portion adjacent to each other having the second flexible parts 150a and 150b each connected thereto in the Y axis direction.

In addition, as shown in FIG. 10, the second flexible parts 150a and 150b are connected to the first mass body 110a and the second mass body 110b so as to be spaced apart from the centers C of gravity of the first mass body 110a and the second mass body 110b by a predetermined interval, respectively. That is, the first mass body 110a and the second mass body 110b are connected to the internal frame 120 by the second flexible parts 150a and 150b so as to be eccentric.

Further, the first mass body 110a and the second mass body 110b are disposed so that coupling parts having the second flexible parts 150a and 150b each coupled thereto are adjacent to each other rather than coupling parts having the first flexible parts 140a and 140b each connected thereto.

Next, the external frame 130 supports the internal frame 120. More specifically, the external frame 130 is provided at an outer side of the internal frame 120 so that the internal frame 120 is spaced, and is connected to the internal frame 120 by the third flexible part 160 and the fourth flexible part 170. Therefore, the internal frame 120 and the first mass body 110a and the second mass body 110b connected to the internal frame 120 are supported by the external frame 130 in the floating state so as to be displaceable.

In addition, the driving unit 190 may be selectively formed on the third flexible part 160 and the fourth flexible part, and is formed on one surface of the third flexible part 160 as a preferred embodiment, as described above. That is, when viewing based on the X-Y plane, since the third flexible part 160 is relatively wide as compared to the fourth flexible part 170, the third flexible part 160 may be provided with the driving unit 190 driving the internal frame 120.

Here, the driving unit 190, which is to drive the internal frame 120 so as to be rotated based on the X axis, may be formed in a piezoelectric scheme, a capacitive scheme, or the like, but is not particularly limited thereto.

In addition, the external frame 130 supports the third flexible part 160 and the fourth flexible part 170 to allow a space in which the internal frame 120 may be displaced to be secured and becomes a basis when the internal frame 120 is displaced. In addition, the external frame 130 may have a square pillar shape in which it has a square pillar shaped cavity formed at the center thereof, but is not limited thereto. That is, the external frame 130 may be formed so as to cover only a portion of the internal frame 120.

Next, the first flexible parts 140a and 140b are beams having a predetermined thickness in a Z axis direction and made of a surface formed by the X axis and Y axis. That is, the first flexible part is formed so as to have a width $W_1$ in the Y axis direction larger than a thickness $T_1$ in the Z axis direction.

In addition, the first flexible parts 140a and 140b may have the sensing units 180a, 180b, 180c, and 180d formed thereon. That is, when viewing based on the X-Y plane, since the first flexible parts 140a and 140b are relatively wide as compared to the second flexible parts 150a and 150b, the first flexible parts 140a and 140b may be provided with the sensing units 180a and 180b sensing the displacement of the first mass body 110a and the second mass body 110b. In addition, the sensing unit may be formed in a piezoelectric scheme, a piezoresistive scheme, a capacitive scheme, an optical scheme, or the like, but is not particularly limited thereto.

In addition, the second flexible parts 150a and 150b are hinges having a predetermined thickness in the X axis direction and having a surface formed by the Y axis and the Z axis. That is, the second flexible parts 150a and 150b are formed so as to have a width $W_2$ in the Z axis direction larger than a thickness $T_2$ in the X axis direction.

In addition, the first flexible parts 140a and 140b and the second flexible parts 150a and 150b are disposed in a direction perpendicular to each other. That is, the first flexible parts 140a and 140b connect the first and second mass bodies 110a and 110b and the internal frame 120 to each other in the X axis direction, respectively, and the second flexible parts 150a and 150b connect the first and second mass bodies 110a and 110b and the internal frame 120 to each other in the Y axis direction, respectively.

Through the above-mentioned configuration, since the second flexible parts 150a and 150b have a width $W_2$ in the Z axis direction larger than a thickness $T_2$ in the X axis direction, the first mass body 110a and the second mass body 110b are limited from being rotated based on the Z axis or translated in the X axis direction, but may be relatively freely rotated based on the Y axis. That is, the first mass body 110a and the second mass body 110b are rotated based on the Y axis direction in a state supported by the internal frame 120 and the second flexible parts 150a and 150b serve as a hinge for the above-mentioned rotation.

Next, the third flexible part 160 is a beam having a predetermined thickness in a Z axis direction and made of a surface formed by the X axis and Y axis. That is, the third flexible part 160 is formed so as to have a width $W_3$ in the X axis direction larger than a thickness $T_3$ in the Z axis direction. Meanwhile, the third flexible part 160 may be disposed in a direction perpendicular to the first flexible direction 110.

In addition, the third flexible part 160 has the driving unit 190 formed thereon, where the driving unit 190, which is to drive the internal frame 120 and the mass body 110, may be formed in a piezoelectric scheme, a capacitive scheme, or the like.

In addition, the fourth flexible part 170 is a hinge having a predetermined thickness in the Y axis direction and having a surface formed by the X axis and the Z axis. That is, the fourth flexible part 170 is formed so as to have a width $W_4$ in the Z axis direction larger than a thickness $T_4$ in the Y axis direction.

In addition, the third flexible part 160 and the fourth flexible part 170 may be disposed in a direction perpendicular to each other. That is, the third flexible part 160 is coupled to the internal frame 120 and the external frame 130 in the Y axis direction, and the fourth flexible part 170 is coupled to the internal frame 120 and the external frame 130 in the X axis direction.

In addition, the fourth flexible part may be disposed so as to correspond to the center of gravity of the mass body part. This is the reason that when the fourth flexible part which is a driving rotation axis of the internal frame is spaced apart from the center of gravity of the mass body part, the inertial force applied to the mass body part in the Z axis generates the displacement of the mass body part even in a situation having no an angular velocity input, thereby generating a noise.

In addition, the second flexible part 150 and the fourth flexible part 170 of the angular velocity sensor according to the preferred embodiment of the present invention may be formed in all possible shapes such as a hinge shape having a rectangular cross section, a torsion bar shape having a circular cross section, or the like.

In addition, since the fourth flexible part 170 has a width $W_4$ in the Z axis direction larger than a thickness $T_4$ in the Y axis, the internal frame 120 may be relatively freely rotated based on the X axis. That is, the internal frame 120 is fixed to the external frame 130 so as to be rotated based on the X axis, and the fourth flexible part 170 serves as a hinge for the rotation of the internal frame 120.

In addition, as the first flexible part 140, the second flexible part 150, the third flexible part 160, and the fourth flexible part 170 are disposed as describe above, the first flexible part 140 and the third flexible part 160 may be disposed in a direction perpendicular to each other. In addition, the second flexible part 150 and the fourth flexible part 170 may be disposed in a direction perpendicular to each other.

In addition, the angular velocity sensor according to the preferred embodiment of the present invention may be configured by a technical configuration forming the driving unit on the fourth flexible part, without including the third flexible part.

Hereinafter, a moveable direction of the mass body in the angular velocity sensor according to the preferred embodiment of the present invention will be described in detail with reference to the drawings.

Figure 12:
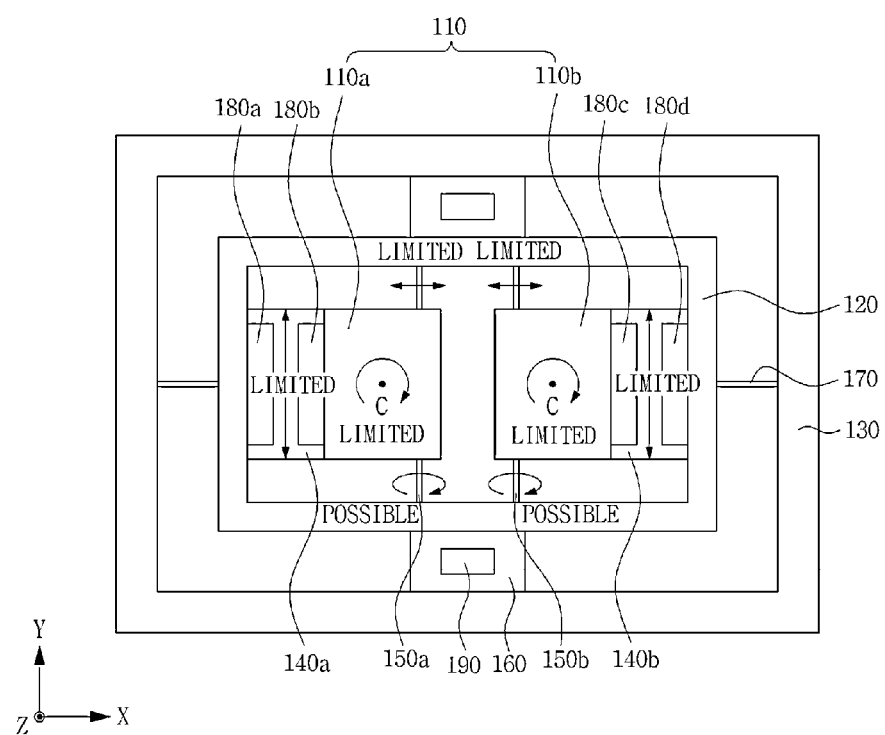
FIG. 12 is a plan view showing movable directions of a first mass body and a second mass body in the angular velocity sensor shown in FIG. 9.

FIG. 12 is a plan view showing movable directions of a first mass body and a second mass body in the angular velocity sensor shown in FIG. 9 and FIG. 13 is a cross-sectional view showing the movable directions of the first mass body and the second mass body in the angular velocity sensor shown in FIG. 10.

As shown, since the second flexible parts 150a and 150b have a width $W_2$ in the Z axis direction larger than a thickness $T_2$ in the X axis direction, the first mass body 110a and the second body 110b are limited from being rotated based on the Z axis or translated in the X axis direction, but may be relatively freely rotated based on the Y axis, with respect to the internal frame 120.

Specifically, in the case in which rigidity of the second flexible parts 150a and 150b at the time of rotation based on the X axis is larger than rigidity of the second flexible parts 150a and 150b at the time of rotation based on the Y axis, the first mass body 110a and second mass body 110b may be freely rotated based on the Y axis, but are limited from being rotated based on the X axis.

Similarly, in the case in which rigidity of the second flexible parts 150a and 150b at the time of translation in the Z axis direction is larger than the rigidity of the second flexible parts 150a and 150b at the time of the rotation based on the Y axis, the second flexible parts 150a and 150b may be freely rotated based on the Y axis, but are limited from being translated in the Z axis direction.

Therefore, as a value of (the rigidity of the second flexible parts 150a and 150b at the time of the rotation based on the X axis or the rigidity of the second flexible parts 150a and 150b at the time of the translation in the Z axis direction)/(the rigidity of the second flexible parts 150a and 150b at the time of the rotation based on the Y axis) increases, the first mass body 110a and the second mass body 110b may be freely rotated based on the Y axis, but are limited from being rotated based on the X axis or translated in the Z axis direction, with respect to the internal frame 120.

That is, as shown in FIGS. 9 and 11, relationships among the width $W_2$ of the second flexible parts 150a and 150b in the Z axis direction, a length $L_2$ thereof in the Y axis direction, the thickness $T_2$ thereof in the X axis direction, and the rigidities thereof in each direction may be represented by the following Equations.

(1) The rigidity of the second flexible parts 150a and 150b at the time of the rotation based on the X axis or the rigidity thereof at the time of the translation in the Z axis direction is $\propto T_2 \times W_2^3 / L_2^3$, (2) The rigidity of the second flexible parts 150a and 150b at the time of the rotation based on the Y axis is $\propto T_2^3 \times W_2 / L_2$. According to the above two Equations, the value of (the rigidity of the second flexible parts 150a and 150b at the time of the rotation based on the X axis or the rigidity of the second flexible parts 150a and 150b at the time of the translation in the Z axis direction)/(the rigidity of the second flexible parts 150a and 150b at the time of the rotation based on the Y axis) is in proportion to $(W_2/(T_2 L_2))^2$.

However, since the second flexible parts 150a and 150b have the width $W_2$ in the Z axis direction larger than the thickness $T_2$ in the X axis direction, $(W_2/(T_2 L_2))^2$ is large, such that the value of (the rigidity of the second flexible parts 150a and 150b at the time of the rotation based on the X axis or the rigidity of the second flexible parts 150a and 150b at the time of the translation in the Z axis direction)/(the rigidity of the second flexible parts 150a and 150b at the time of the rotation based on the Y axis) increases.

Due to above-mentioned characteristics of the second flexible parts 150a and 150b, the internal frame 120 is rotated based on the Y axis, but is limited from being rotated based on the X axis or translated in the Z axis direction, with respect to the external frame 130, and is rotated only based on the Y axis.

Meanwhile, the first flexible parts 140a and 140b have relatively very high rigidity in the length direction (X axis direction), thereby making it possible to limit the first and second mass bodies 110a and 110b from being rotated based on the Z axis or translated in the Z axis direction, with respect to the internal frame 120.

In addition, the second flexible parts 150a and 150b have relatively very high rigidity in the length direction (Y axis direction), thereby making it possible to limit the first and second mass bodies 110a and 110b from being translated in the Y axis direction, with respect to the internal frame 120.

As a result, due to the characteristics of the first flexible parts 140a and 140b and the second flexible parts 150a and 150b described above, the first and second mass bodies 110a and 110b may be rotated based on the Y axis, but are limited from being rotated based on the X or Z axis or translated in the Z, Y, or X axis direction, with respect to the internal frame 120. That is, the movable directions of the first and second mass bodies 110a and 110b may be represented by the following Table 2.

TABLE 2

| Moveable directions of the first mass body and the second mass body (based on the internal frame) | Whether or not movement is possible |
|---|---|
| Rotation based on X axis | Limited |
| Rotation based on Y axis | Possible |
| Rotation based on Z axis | Limited |
| Translation in X axis direction | Limited |
| Translation in Y axis direction | Limited |
| Translation in Z axis direction | Limited |

As described above, since the first mass body 110a and second mass body 110b may be rotated based on the X axis, that is, the second flexible parts 150a and 150b, but are limited from being moved in the remaining directions, with respect to the internal frame 120, the first mass body 110a and the second mass body 110b may be allowed to be displaced only with respect to force in a desired direction (the rotation based on the Y axis).

In addition, as shown in FIG. 10, the first mass body 110a and the second mass body 110b are disposed so that the centers C of gravity thereof are spaced apart from a rotation center R to which the second flexible parts 150a and 150b are coupled, with respect to the X axis. That is, the first mass body 110a and the second mass body 110b are disposed so that the second flexible parts 150a and 150b are spaced apart from the center parts of the first mass body 110a and the second mass body 110b, respectively, such that the first mass body 110a and the second mass body 110b have different displacements at both sides thereof based on a rotation axis.

Figure 14B:
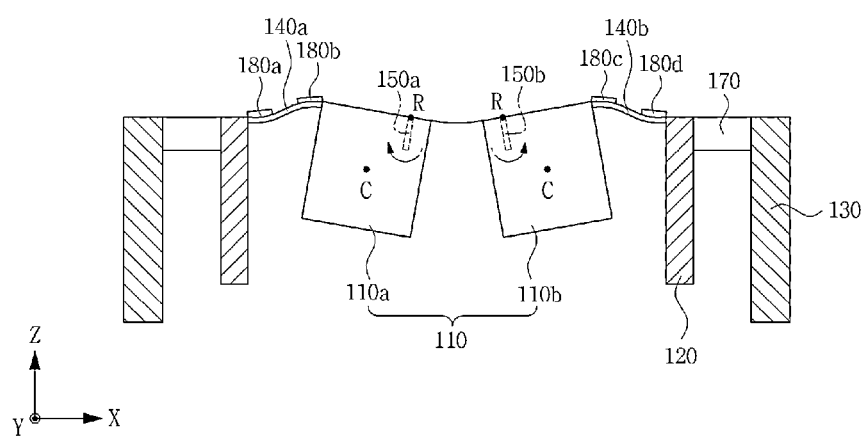

FIGS. 14A and 14B are cross-sectional views showing a process in which the first mass body and the second mass body shown in FIG. 10 are rotated based on the second flexible parts with respect to an internal frame.

As shown, the first mass body 110a and the second mass body 110b are rotated based on the Y axis with respect to a rotation axis R. In this case, the first flexible parts 140a and 140b generate compressive stress and bending stress, and the second flexible parts 150a and 150b generate torsion stress based on the Y axis. In this case, in order to generate a torque in the first mass body 110a and the second mass body 110b, the second flexible parts 150a and 150b may be connected the first mass body 110a and the second mass body 110b over the centers C of gravity of the first mass body 110a and the second mass body 110b based on the Z axis direction.

In addition, in order to simultaneously detect angular velocity of two axes, that is, the X axis and the Z axis, the second flexible parts 150a and 150b are coupled to the first mass body 110a and the second mass body 110b so as to be spaced apart from the centers C of gravity of the first mass body 110*a* and the second mass body 110*b* by a predetermined interval.

In addition, in order to detect the displacements of the first mass body 110*a* and the second mass body 110*b*, the sensing unit is formed of a first sensing unit 180*a*, a second sensing unit 180*b*, a third sensing unit 180*c*, and a fourth sensing unit 180*d*, where the first sensing unit 180*a* and the second sensing unit 180*b* are formed on the first flexible part 140*a* connected to the first mass body 110*a*, and the third sensing unit 180*c* and the fourth sensing unit 180*d* are formed on the first flexible unit 140*b* connected to the second mass body 110*b*.

As shown, since the first mass body 110*a* is rotated in the Y axis as the rotation axis R with the respect to the internal frame 120, that is, the first mass body 110*a* is rotated based on an axis to which the second flexible part 150*a* is coupled, with respect to the internal frame 120, the first flexible part 140*a* generates the bending stress in which the compressive stress and the tensile stress are combined, and the second flexible part 150*a* generates the torsion stress based on the X axis.

In this case, in order to generate a torque in the first mass body 110*a*, the second flexible part 150*a* may be provided over the center C of gravity of the first mass body 110*a* based on the Z axis direction.

In addition, the bending stressing of the first flexible part 140*a* is detected by the sensing units 180*a* and 180*b*. In addition, one first flexible part 140*a* may have two sensing units 180*a* and 180*b* formed thereon to improve sensitivity and cancel a noise.

In addition, similar to the first mass body 110*a*, since the second mass body 110*b* is also rotated in the Y axis as the rotation axis R with the respect to the internal frame 120, that is, the second mass body 110*b* is rotated based on an axis to which the second flexible part 150*a* is coupled, with respect to the internal frame 120, the first flexible part 140*b* generates the bending stress in which the compressive stress and the tensile stress are combined, and the second flexible part 150*b* generates the torsion stress based on the X axis.

In this case, in order to generate a torque in the second mass body 110*b*, the second flexible part 150*b* may be provided over the center C of gravity of the first mass body 110*b* based on the Z axis direction.

In addition, the bending stressing of the first flexible part 140*b* is detected by the sensing units 180*c* and 180*d*. In addition, one first flexible part 140*b* may have two sensing units 180*c* and 180*d* formed thereon to improve the sensitivity and cancel the noise.

Next, the movable direction of the internal frame in the angular velocity sensor according to the preferred embodiment of the present invention will be described in detail with reference to FIGS. 15 and 16.

Figure 15:
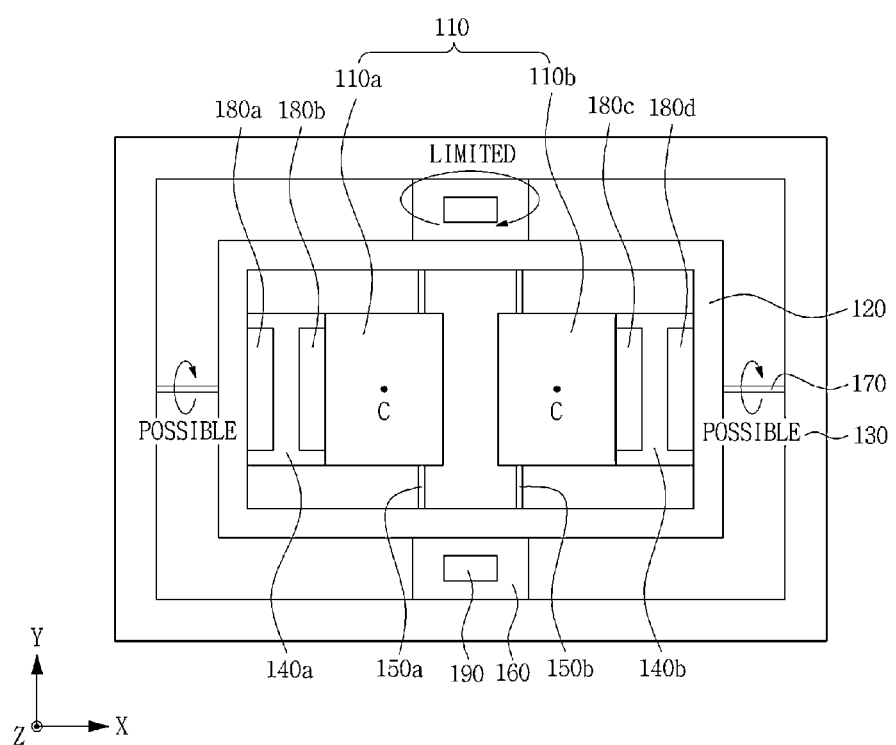
FIG. 15 is a plan view showing movable direction of the internal frame in the angular velocity sensor shown in FIG. 9.
Figure 16:
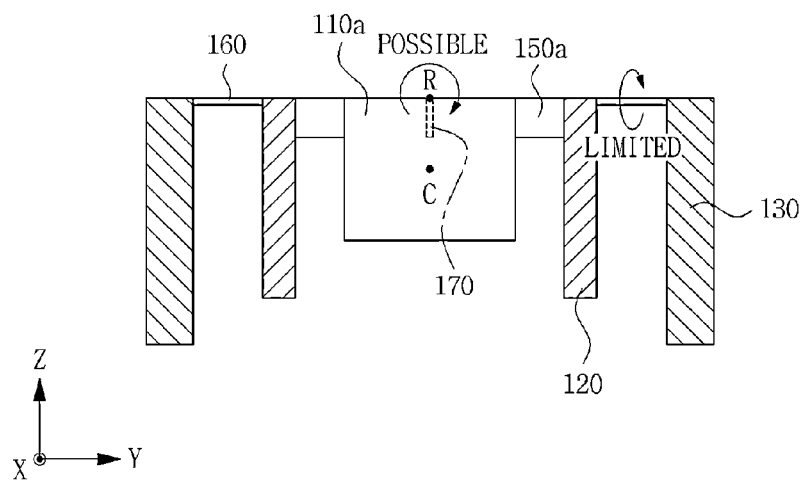
FIG. 16 is a cross-sectional view showing a movable direction of the internal frame in the angular velocity sensor shown in FIG. 11.

FIG. 15 is a plan view showing movable direction of the internal frame in the angular velocity sensor shown in FIG. 9 and FIG. 16 is a cross-sectional view showing movable direction of the internal frame in the angular velocity sensor shown in FIG. 11.

First, as shown in FIGS. 9 and 10, since the fourth flexible part 170 has the width $W_4$ in the Z axis direction larger than the thickness $T_4$ in the Y axis direction, the internal frame 120 is limited from being rotated based on the Y axis or translated in the Z axis direction, but may be relatively freely rotated based on the X axis, with respect to the external frame 130.

Specifically, in the case in which rigidity of the fourth flexible part 170 at the time of rotation based on the Y axis is larger than rigidity of the fourth flexible part 170 at the time of rotation based on the X axis, the internal frame 120 may be freely rotated based on the X axis, but are limited from being rotated based on the Y axis.

Similarly, in the case in which rigidity of the fourth flexible part 170 at the time of translation in the Z axis direction is larger than the rigidity of the fourth flexible part 170 at the time of the rotation based on the X axis, the internal frame 120 may be freely rotated based on the X axis, but are limited from being translated in the Z axis direction.

Therefore, as a value of (the rigidity of the fourth flexible part 170 at the time of the rotation based on the Y axis or the rigidity of the fourth flexible part 170 at the time of the translation in the Z axis direction)/(the rigidity of the fourth flexible part 170 at the time of the rotation based on the X axis) increases, the internal frame 120 may be freely rotated based on the X axis, but are limited from being rotated based on the Y axis or translated in the Z axis direction, with respect to the external frame 130.

That is, relationships among the width $W_4$ of the fourth flexible part 170 in the Z axis direction, a length $L_4$ thereof in the X axis direction, the thickness $T_4$ thereof in the Y axis direction, and the rigidities thereof in each direction may be represented by the following Equations.

(1) The rigidity of the fourth flexible part 170 at the time of the rotation based on the Y axis or the rigidity thereof at the time of the translation in the Z axis direction is $\propto W_4^3 \times T_4/L_4^3$, (2) The rigidity of the fourth flexible part 170 at the time of the rotation based on the X axis is $\propto T_4^3 \times W_4/L_4$.

According to the above two Equations, the value of (the rigidity of the fourth flexible part 170 at the time of the rotation based on the Y axis or the rigidity of the fourth flexible part 170 at the time of the translation in the Z axis direction)/(the rigidity of the fourth flexible part 170 at the time of the rotation based on the X axis) is in proportion to $(W_4/(T_4 L_4))^2$. However, since the fourth flexible part 170 according to the preferred embodiment has the width W4 in the Z axis direction larger than the thickness $T_4$ in the Y axis direction, $(W_4/(T_4 L_4))^2$ is large, such that the value of (the rigidity of the fourth flexible part 170 at the time of the rotation based on the Y axis or the rigidity of the fourth flexible part 170 at the time of the translation in the Z axis direction)/(the rigidity of the fourth flexible part 170 at the time of the rotation based on the X axis) increases. Due to these characteristics of the fourth flexible part 170, the internal frame 120 is freely rotated based on the X axis, but is limited from being rotated based on the Y axis or translated in the Z axis direction, with respect to the external frame 130.

Meanwhile, the third flexible part 160 has relatively very high rigidity in the length direction (the Y axis direction), thereby making it possible to limit the internal frame 120 from being rotated based on the Z axis or translated in the Y axis direction, with respect to the external frame 130.

In addition, the fourth flexible part 170 has relatively very high rigidity in the length direction (the X axis direction), thereby making it possible to limit the first mass body 110*a* and the second mass body 110*b* from being translated in the X axis direction with respect to the internal frame 120.

As a result, due to the characteristics of the third flexible part 160 and the fourth flexible part 170 described above, the internal frame 120 may be rotated based on the X axis, but are limited from being rotated based on the Y or Z axis or translated in the Z, Y, or X axis direction, with respect to the external frame 130.

That is, the movable direction of the internal frame 120 may be represented by the following Table 3.

TABLE 3

| (Based on the external frame) | Whether or not movement is possible |
| --- | --- |
| Rotation based on X axis | Possible |
| Rotation based on Y axis | Limited |
| Rotation based on Z axis | Limited |
| Translation in X axis direction | Limited |
| Translation in Y axis direction | Limited |
| Translation in Z axis direction | Limited |

As described above, since the internal frame 120 may be rotated based on the X axis, but is limited from being moved in the remaining directions, with respect to the external frame 130, the internal frame 120 may be allowed to be displaced only with respect to force in a desired direction (the rotation based on the X axis).

Figure 17A:
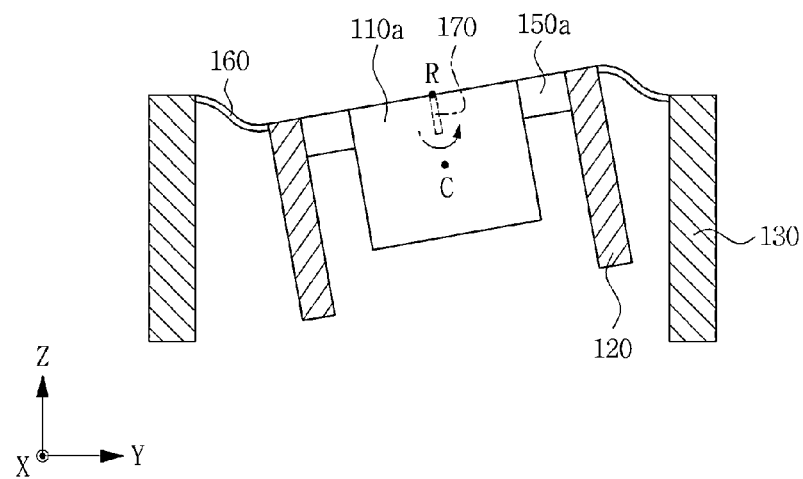
FIGS. 17A and 17B are cross-sectional views showing a process in which the internal frame shown in FIG. 16 is rotated based on a fourth flexible part with respect to an external frame.
Figure 17B:
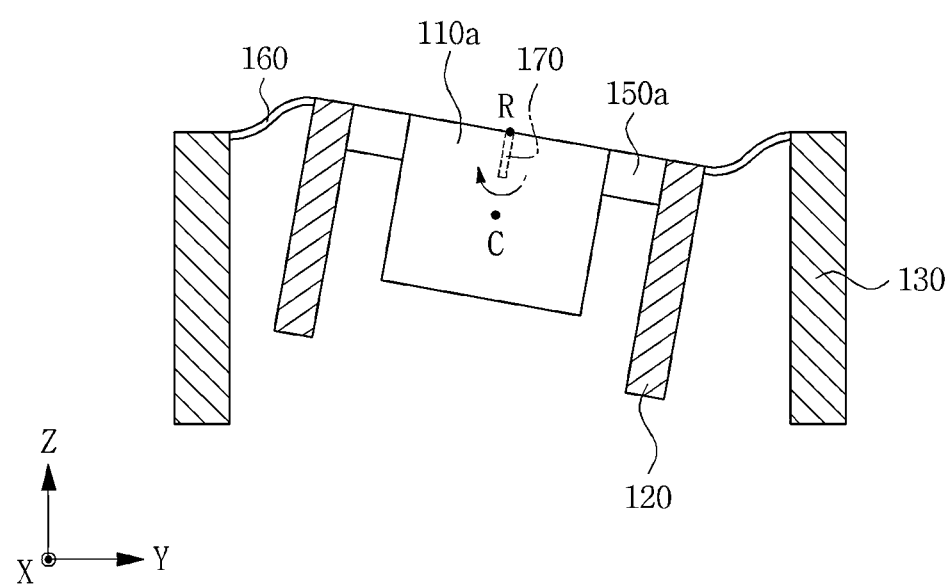

FIGS. 17A and 17B are cross-sectional views showing a process in which the internal frame in the angular velocity sensor shown in FIG. 16 is rotated based on a fourth flexible part with respect to an external frame.

As shown, the internal frame 120 is rotated based on the X axis with respect to the external frame 130, that is, is rotated based on the fourth flexible part 170 hinge-coupling the internal frame 120 to the external frame 130, such that the third flexible part 160 generate the bending stress in which the compressive stress and the tensile stress are combined, and the fourth flexible part 170 generates the tension stress based on the X axis.

The angular velocity sensor according to the preferred embodiment of the present invention is configured as described above. Hereinafter, a method of measuring an angular velocity by the angular velocity sensor 100 will be described in detail.

First, the internal frame 120 is rotated based on the X axis with respect to the external frame 130 using the driving unit 190. In this case, the first mass body 110a and the second mass body 110b are vibrated while being rotated based on the X axis together with the internal frame 120, and may be rotated only based on the Y axis with the internal frame 120 due to the characteristics of the first flexible parts 140a and 140b and the second flexible parts 150a and 150b described above in response to on the vibration.

That is, even though the internal frame 120 is rotated based on the X axis with respect to the external frame 130 using the driving unit 190, the first mass body 110a and the second mass body 110b are not rotated based on the X axis with respect to the internal frame 120.

In this case, the first mass body 110a and the second mass body 11b are rotated so as to be symmetrical to each other as shown in FIGS. 14A and 14B by arrows. In addition, due to the characteristics of the third flexible part 160 and the fourth flexible part 170, the internal frame 120 may be rotated only based on the X axis with respect to the external frame 130. When the displacements of the first mass body 110a and the second mass body 110b are sensed using the sensing units 180a, 180b, 180c, and 180d, even though Coriolis' force is applied into the X axis direction, the internal frame 120 is not rotated based on the Y axis with respect to the external frame 130, and only the first mass body 110a and the second mass body 110b are rotated based on the Y axis with the internal frame 120 so as to be symmetrical to each other.

That is, the first mass body 110a and the second mass body 110b are rotated based on the Y axis with respect to the internal frame 120, the sensing units 180a and 180b formed on the first flexible part 140a detect the displacement of the first mass body 110a to thereby calculate the Coriolis' force, and the sensing units 180c and 180d formed on the first flexible part 140b detect the displacement of the second mass body 110b to thereby calculate the Coriolis' force.

In addition, when the internal frame 120 is rotated based on the X axis with respect to the external frame 130 by the driving unit 190, the first mass body 110a and the second mass body 110b are vibrated while being rotated based on the X axis together with the internal frame 120 and generate a velocity Vy in the Y axis in response to the vibration.

In this case, when angular velocities $\Omega x$ and $\Omega z$ based on the X axis or Y axis are applied to the first mass body 110a and the second mass body 110b, the Coriolis' force generates in the Z axis or X axis, where the Coriolis' force generates a displacement rotating the first mass body 110a and the second mass body 110b based on the Y axis with the respect to the internal frame 120.

In this case, the Coriolis' force in the Z axis direction generates the displacement in an opposite direction to each other with respect to the first mass body 110a and the second mass body 110b, and the Coriolis' force in the X axis generates the displacement in the same direction as each other with respect to the first mass body 110a and the second mass body 110b.

In addition, the sensing units 180a, 180b, 180c, and 180d detect the displacements of the first mass body 110a and the second mass body 110b to thereby calculate the Coriolis' force, and the angular velocity $\Omega x$ in the X axis direction and the angular velocity $\Omega z$ in the z axis direction are detected by the above-mentioned Coriolis' force.

Through the above-mentioned configuration, the angular velocity sensor 100 according to the preferred embodiment of the present invention is implemented as the angular velocity sensor capable of accurately detecting the angular velocity in the X axis direction and the angular velocity in the Z axis direction by the first mass body 110a and the second mass body 110b.

Although the exemplary embodiment of the present invention has been disclosed for illustrative purposes, it will be appreciated that the present invention is not limited thereto, and those skilled in the art will appreciate that various modifications, additions and substitutions are possible, without departing from the scope and spirit of the invention. Particularly, the present invention has been described based on the "X axis", the "Y axis", and the "Z axis", which are defined for convenience of explanation. Therefore, the scope of the present invention is not limited thereto.

Accordingly, any and all modifications, variations or equivalent arrangements should be considered to be within the scope of the invention, and the detailed scope of the invention will be disclosed by the accompanying claims.

According to the preferred embodiment of the present invention, the acceleration sensor capable of simultaneously detecting the physical amounts for the multiple axes by including two mass bodies connected to be eccentric to thereby generate the different displacements may be obtained.

In addition, according to another preferred embodiment of the present invention, the angular velocity sensor capable of removing interference between the driving mode and the sensing mode and decreasing the effect due to the manufacturing error by driving the frame and the mass body by one driving part to individually generate the driving displacement and the sensing displacement of the mass body and having the flexible part formed so that the mass body is movable only in the specific direction and capable of accurately detecting the angular velocity of two axes by including two mass bodies connected to be eccentric and using the different driving and displacements of the first mass body and the second mass body caused by the frame driving may be obtained.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. An acceleration sensor, comprising:
   a mass body part comprising a first mass body and a second mass body;
   a frame supporting the first mass body and the second mass body;
   first flexible parts each connecting the first mass body and the second mass body to the frame; and
   second flexible parts each connecting the first mass body and the second mass body to the frame,
   wherein the second flexible parts are connected to the first mass body and the second mass body so as to be spaced apart from the centers of gravity of the first mass body and the second mass body,
   wherein the first flexible parts have a width W1 in a Y-axis direction larger than a thickness T1 in the Z-axis direction, and
   wherein the second flexible parts have a width W2 in a Z-axis direction larger than a thickness T2 in the X-axis direction.

2. The acceleration sensor as set forth in claim 1, wherein the first flexible parts and the second flexible parts are disposed in a direction perpendicular to each other.

3. The acceleration sensor as set forth in claim 1, wherein the first mass body and the second mass body have one end having the first flexible parts each connected thereto and have the other end portions having the second flexible parts each connected thereto.

4. The acceleration sensor as set forth in claim 3, wherein the first mass body and the second mass body have one end having the first flexible parts each connected thereto with respect to an X axis direction and have the other end portions having the second flexible parts connected thereto in a Y axis direction with respect to the X axis direction.

5. The acceleration sensor as set forth in claim 3, wherein the first mass body and the second mass body face each other so that coupling parts having the second flexible parts each coupled thereto are adjacent to each other.

6. The acceleration sensor as set forth in claim 1, wherein the first flexible parts are beams having a surface formed by one axis direction and the other axis direction and a thickness extended in a direction perpendicular to the surface.

7. The acceleration sensor as set forth in claim 6, wherein the first flexible parts have a thickness in a Z axis direction, and are beams disposed along a surface formed by an X axis and a Y axis.

8. The acceleration sensor as set forth in claim 7, wherein the first flexible parts connect one end portion of the first mass body and the frame to each other and connect one end portion of the second mass body and the frame to each other, in the X axis direction.

9. The acceleration sensor as set forth in claim 1, wherein one surface of the first flexible parts or the second flexible parts is provided with a sensing unit configured to sense displacement of the first mass body and the second mass body.

10. The acceleration sensor as set forth in claim 1, wherein the second flexible parts are hinges having a thickness in one axis direction and having a surface formed in the other axis direction.

11. The acceleration sensor as set forth in claim 10, wherein the second flexible parts are hinges having a thickness in an X axis direction and having a surface disposed along a Y axis and a Z axis.

12. The acceleration sensor as set forth in claim 1, wherein the second flexible parts connect the first mass body and the frame and connect the second mass body and the frame, in a Y axis direction.

13. The acceleration sensor as set forth in claim 1, wherein the second flexible parts have a hinge shape having a rectangular cross section or a torsion bar shape having a circular cross section.

14. An angular velocity sensor, comprising:
   a mass body part comprising a first mass body and a second mass body;
   an internal frame supporting the first mass body and the second mass body;
   first flexible parts each connecting the first mass body and the second mass body to the internal frame;
   second flexible parts each connecting the first mass body and the second mass body to the internal frame,
   an external frame supporting the internal frame;
   a third flexible part connecting the internal frame and the external frame; and a fourth flexible part connecting the internal frame and the external frame,
   wherein the second flexible parts are connected to the first mass body and the second mass body so as to be spaced apart from the centers of gravity of the first mass body and the second mass body,
   wherein the first flexible parts have a width W1 in a Y-axis direction larger than a thickness T1 in the Z-axis direction, and
   wherein the second flexible parts have a width W2 in a Z-axis direction larger than a thickness T2 in the X axis direction.

15. The angular velocity sensor as set forth in claim 14, wherein the first flexible parts and the second flexible parts are disposed in a direction perpendicular to each other.

16. The angular velocity sensor as set forth in claim 14, wherein the third flexible part and the fourth flexible part are disposed in a direction perpendicular to each other.

17. The angular velocity sensor as set forth in claim 14, wherein the third flexible part is disposed in a direction perpendicular to the first flexible parts.

18. The angular velocity sensor as set forth in claim 14, wherein the fourth flexible part is disposed in a direction perpendicular to the second flexible parts.

19. The angular velocity sensor as set forth in claim 14, wherein the first flexible parts are beams having a surface formed by one axis direction and the other axis direction and a thickness extending in a direction perpendicular to the surface.

20. The angular velocity sensor as set forth in claim 19, wherein the first flexible parts have a thickness in a Z axis direction, and are beams disposed along a surface formed by an X axis and a Y axis.

21. The angular velocity sensor as set forth in claim 20, wherein the first flexible parts connect one end portion of the first mass body and the internal frame and connect one end portion of the second mass body and the internal frame, in the X axis direction.

22. The angular velocity sensor as set forth in claim 14, wherein one surface of the first flexible parts or the second flexible parts is provided with a sensing unit configured to sense displacement of the first mass body and the second mass body.

23. The angular velocity sensor as set forth in claim 14, wherein the second flexible parts are hinges having a thickness in one axis direction and having a surface formed in the other axis direction.

24. The angular velocity sensor as set forth in claim 23, wherein the second flexible parts are hinges having a thickness in an X axis direction and having a surface formed by a Y axis and a Z axis.

25. The angular velocity sensor as set forth in claim 14, wherein the second flexible parts connect the first mass body and the internal frame and connect the second mass body and the internal frame, in a Y axis direction.

26. The angular velocity sensor as set forth in claim 14, wherein the second flexible parts have a hinge shape having a rectangular cross section or a torsion bar shape having a circular cross section.

27. The angular velocity sensor as set forth in claim 14, wherein the third flexible part is a beam having a surface formed by one axis direction and the other axis direction and a thickness extending in a direction perpendicular to the surface.

28. The angular velocity sensor as set forth in claim 27, wherein the third flexible part has a thickness in a Z axis direction, is a beam configured of a surface formed by an X axis and a Y axis, and is formed so as to have a width $W_3$ in an X axis direction larger than a thickness $T_3$ in the Z axis direction.

29. The angular velocity sensor as set forth in claim 14, wherein the fourth flexible part is a hinge having a thickness in one axis direction and having a surface formed in the other axis direction.

30. The angular velocity sensor as set forth in claim 29, wherein the fourth flexible part is a hinge having a thickness in a Y axis direction and having a surface formed by a X axis and a Z axis.

31. The angular velocity sensor as set forth in claim 29, wherein the fourth flexible part is formed so as to have a width $W_4$ in a Z axis direction larger than a thickness $T_4$ in a Y axis direction.

32. The angular velocity sensor as set forth in claim 14, wherein the fourth flexible part is disposed so as to correspond to the centers of gravity of the first mass body and the second mass body.

33. The angular velocity sensor as set forth in claim 14, wherein one surface of the third flexible part or the fourth flexible part is provided with a driving unit configured to drive the internal frame.

34. The angular velocity sensor as set forth in claim 33, wherein the internal frame is configured to rotate based on an axis having the fourth flexible part coupled thereto, with respect to the external frame, in response to the internal frame being driven by the driving unit.

35. The angular velocity sensor as set forth in claim 34, wherein the third flexible part is configured to generate bending stress and the fourth flexible part is configured to generate torsion stress, in response to the internal frame being rotated based on the axis having the fourth flexible part coupled thereto.

36. The angular velocity sensor as set forth in claim 34, wherein the first mass body and the second mass body are configured to rotate based on an axis having the second flexible parts coupled thereto, with respect to the internal frame, in response to the internal frame being rotated based on the axis having the fourth flexible part coupled thereto.

37. The angular velocity sensor as set forth in claim 36, wherein the first flexible parts generate bending stress and the second flexible parts generate torsion stress, in response to the first mass body and the second mass body being rotated.

38. The angular velocity sensor as set forth in claim 14, wherein the first mass body and the second mass body have one end having the first flexible parts each connected thereto and have the other end portions having the second flexible parts each connected thereto.

39. The angular velocity sensor as set forth in claim 38, wherein the first mass body and the second mass body have one end having the first flexible parts each connected thereto with respect to an X axis direction and have the other end portions having the second flexible parts connected thereto in aY axis direction with respect to the X axis direction.

40. The angular velocity sensor as set forth in claim 38, wherein the first mass body and the second mass body face each other so that coupling parts having the second flexible parts each coupled thereto are adjacent to each other rather than coupling parts having the first flexible parts each coupled thereto.

\* \* \* \* \*